United States Patent
Nodera et al.

(12) 
(10) Patent No.: US 6,448,324 B1
(45) Date of Patent: *Sep. 10, 2002

(54) FLAME-RETARDANT POLYCARBONATE RESIN COMPOSITION AND ITS BLOW MOLDINGS

(75) Inventors: Akio Nodera; Naoki Mitsuta; Kouichi Hara, all of Ichihara (JP)

(73) Assignee: Idemitsu Petrochemical Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/365,406

(22) Filed: Aug. 2, 1999

(30) Foreign Application Priority Data

Aug. 18, 1998 (JP) .......................................... 10-231264

(51) Int. Cl.⁷ ........................... C08K 3/34; C08L 69/00; C08L 33/12; C08L 25/08
(52) U.S. Cl. ..................... 524/451; 264/331.8; 524/127; 524/141; 524/410; 524/411; 524/412; 525/67; 525/148; 525/227; 526/329.7
(58) Field of Search ................. 524/410, 411, 524/412, 127, 141, 80, 451; 525/67, 227, 148; 526/329.7; 264/331.18

(56) References Cited

U.S. PATENT DOCUMENTS

| | | | |
|---|---|---|---|
| 3,742,088 A | | 6/1973 | Holder et al. |
| 3,772,258 A | * | 11/1973 | Lachowicz et al. ...... 526/329.7 |
| 4,440,905 A | * | 4/1984 | Dunkelberger ............... 525/67 |
| 4,550,136 A | * | 10/1985 | Hosch ...................... 526/329.7 |
| 4,743,654 A | * | 5/1988 | Kyu et al. ................... 525/148 |
| 4,880,554 A | * | 11/1989 | Newman et al. ............... 525/67 |
| 5,087,663 A | * | 2/1992 | Laughner ..................... 525/67 |
| 5,258,432 A | * | 11/1993 | Ogoe et al. .................... 525/67 |
| 5,273,706 A | * | 12/1993 | Laughner ..................... 525/146 |
| 5,280,070 A | * | 1/1994 | Drzewinski .................. 525/148 |
| 5,292,786 A | * | 3/1994 | Gaggar et al. ............... 525/148 |
| 5,352,500 A | * | 10/1994 | Memon ....................... 525/148 |
| 5,476,888 A | * | 12/1995 | Eiffler et al. ................ 524/123 |
| 5,837,757 A | | 11/1998 | Nodera et al. .............. 524/143 |
| 5,883,194 A | * | 3/1999 | Saito et al. .................. 525/148 |

FOREIGN PATENT DOCUMENTS

| | | | |
|---|---|---|---|
| DE | 23 20 786 A | 11/1974 | |
| EP | 0 463 368 A | 1/1992 | |
| EP | 0 483 628 A | 5/1992 | |
| GB | 882586 | * 11/1961 | ............. 526/329.7 |
| WO | WO 99 28385 A | 6/1999 | |

* cited by examiner

*Primary Examiner*—Peter Szekely
(74) *Attorney, Agent, or Firm*—Oblon, Spivak, McClelland, Maier & Neustadt, P.C.

(57) ABSTRACT

Provided are a flame-retardant polycarbonate resin composition having good blow moldability, and blow moldings of the composition having good flame retardancy and having good impact resistance, high mechanical strength and good thermal stability intrinsic to polycarbonate resins. The composition comprises 100 parts by weight of a resin or resin mixture of (A) from 30 to 100% by weight of a polycarbonate resin and (B) from 0 to 70% by weight of a styrenic resin, from 1 to 50 parts by weight of (C) a flame retardant, and from 1 to 20 parts by weight of (D) a methyl methacrylate polymer having a weight-average molecular weight of at least 1,000,000, and optionally contains (E) a fluoro-olefinic resin, (F) a rubber-like elastomer, and (G) an inorganic filler.

10 Claims, No Drawings

FLAME-RETARDANT POLYCARBONATE RESIN COMPOSITION AND ITS BLOW MOLDINGS

BACKGROUND OF THE INVENTION

1. Field of the Invention

The present invention relates to a flame-retardant polycarbonate resin composition and its blow moldings. More precisely, it relates to a flame-retardant polycarbonate resin composition having the advantage of flame retardancy, thermal stability and draw-down resistance and cable of being formed into large-size moldings through blow molding, vacuum molding or pneumatic compression molding, and also to blow moldings of the composition.

2. Description of the Related Art

As having the advantages of impact resistance, heat resistance and good electric properties, polycarbonate resins have many applications in various fields of, for example, office automation appliances, electric and electronic appliances for industrial and household use, car parts and building materials. However, there are some problems with polycarbonate resins in that they require high molding and working temperatures and their melt fluidity is low. As requiring relatively high molding and working temperatures, polycarbonate resins, especially those containing various additives are often problematic in that their thermal stability is poor while they are molded and worked and that their moldings could not exhibit their good properties. As a rule, polycarbonate resins are self-extinguishable. However, some of their applications to office automation appliances, electric and electronic appliances for industrial and household use and others require high-level flame retardancy. To meet the requirement, various flame retardants are added to polycarbonate resins.

In general, polycarbonate resins are formed into moldings of office automation appliances, electric and electronic appliances for industrial and household use and others, through injection molding, and such their moldings are required to be lightweight and thin-walled from the viewpoint of resources saving. However, injection molding of polycarbonate resins to give thin-walled products is naturally limited because of the limited melt viscosity of the resins and of the intended rigidity of the molded products. For these reasons, blow molding of polycarbonate resins is tried for producing lightweight moldings of those appliances and components. However, in order to ensure high-level flame retardancy of polycarbonate resins, a relatively large amount of a flame retardant must be added to the resins. In particular, polymer alloys of polycarbonate resin and rubber-like polymer-modified styrenic resin that are intended to have both good moldability and good impact resistance are problematic in that their blow moldability is poor and stable production of blow moldings of such polymer alloys is impossible.

For improving the blow moldability of polycarbonate resins, it is known that polycarbonate resins having a branched structure are favorable to blow molding. However, depending on the size and the shape of the moldings to be formed therefrom, such polycarbonate resins having a branched structure are often still problematic in that their melt fluidity, blow moldability and pinch-off strength are not satisfactory.

On the other hand, in these days, blow molding is being tried, in place of injection molding, for producing lightweight and thin-walled moldings of covers or housings for office automation appliances such as duplicators and others, from the viewpoint of resources saving. However, those moldings generally have a relatively large surface area and substantially differ from ordinary blow moldings having a hollow inner space such as containers. Specifically in producing them, ribs must be formed for which a parison is welded between the surface parts, so as to prevent the depression in the strength and the rigidity of the thin-walled moldings. Therefore, in producing these moldings, not only their pinch-off strength but also the weld strength of the ribs as welded inside them is needed. In particular, when a relatively large amount of a flame retardant is added to polycarbonate resins so as to increase the flame retardancy of the resins, a rubber-like polymer-modified styrenic resin is added thereto thereby to ensure the impact resistance and other physical properties of the moldings of the resin compositions. The polycarbonate resin compositions comprising them are desired to have good blow moldability.

Compositions of polycarbonate resins to which are added styrenic resins such as acrylonitrile-butadiene-styrene resins (ABS resins), acrylonitrile-styrene resins (AS resins) and the like for the purpose of improving the melt fluidity of the resin compositions are known as polymer alloys, and have many applications typically in the field of injection moldings as having good heat resistance and impact resistance. Of their applications, where such polycarbonate resin compositions are used for office automation appliances, electric and electronic appliances and others, they are required to have high flame retardancy of not lower than a predetermined level so as to ensure and increase the safety of their moldings.

To meet the requirements as above, various methods have heretofore been proposed. Concretely, JP-A-61-55145 discloses a thermoplastic resin composition comprising (A) an aromatic polycarbonate resin, (B) an ABS resin, (C) an AS resin, (D) a halogen compound, (E) a phosphate, and (F) a polytetrafluoroethylene component. JP-A-2-32154 discloses a molding polycarbonate composition with high flame retardancy and high impact resistance, comprising (A) an aromatic polycarbonate resin, (B) an ABS resin, (C) an As resin, (D) a phosphate, and (E) a polytetrafluoroethylene component. JP-A-8-239565 discloses a polycarbonate resin composition comprising (A) an aromatic polycarbonate, (B) an impact-resistant polystyrene resin with rubber-like elasticity, (D) a halogen-free phosphate, (C) a core/shell type, grafted rubber-like elastomer, and (E) talc.

These are all to improve the melt fluidity and therefore the moldability of polycarbonate resins, and to improve the impact resistance and the flame retardancy of the moldings of polycarbonate resins. As having such improved properties, the polycarbonate resin compositions proposed are formed into various practicable moldings. However, they are targeted to injection moldings, and it is difficult to directly apply them to blow moldings. In particular, it is difficult to directly apply them to relatively large-sized moldings or to blow moldings having nearly tabular ribs such as those mentioned above.

In order to improve the blow moldability of polycarbonate resins, various methods have been proposed. For example, (1) JP-A-1-268761 discloses a method of mixing an engineering resin such as a polycarbonate resin or the like with an acrylic polymer having a weight-average molecular weight of at least about 500,000; (2) JP-B-5-422 discloses use of a copolymer of methyl methacrylate and a vinylic monomer as prepared through emulsion polymerization in the presence of a specific emulsifier, as a working promoter for thermoplastic resins; and (3) JP-B-8-6022 discloses a thermoplastic resin composition comprising a polycarbonate resin or a polybutylene terephthalate resin, and containing a copolymer of an alkyl methacrylate and an alkyl acrylate having a specific relative viscosity, and carbon black having a specific relative surface area and a specific degree of oil absorption. However, the composition in (3) is problematic in that it indispensably requires carbon black and could not be formed into white moldings, and therefore its applications are limited. In addition, none of those (1) to (3) refers to the flame retardancy of resin compositions.

On the other hand, some flame-retardant resin compositions for blow moldings have been proposed. For example, (4) JP-A-9-310011 discloses a resin composition comprising an aromatic polycarbonate resin, a styrene-acrylonitrile resin, a phosphate serving as a flame retardant, and ultra-fine grains of anhydrous silica; and (5) JP-A-10-158497 discloses a resin composition for blow moldings, comprising a polycarbonate resin, an ABS resin, a SAN resin, a flame retardant, and a polytetrafluoroethylene. In those compositions, the additive of ultra-fine grains of anhydrous silica or styrene-acrylonitrile resin improves the blow moldability of the compositions. However, depending on the type of the blow moldings to be formed from the compositions, the additive is not still satisfactory for improving the blow moldability of the compositions.

SUMMARY OF THE INVENTION

In that situation, the object of the present invention is to provide an improved, flame-retardant polycarbonate resin composition having good flame retardancy, good thermal stability, good moldability especially good blow moldability, and satisfactory pinch-off strength, and capable of being formed into moldings especially blow moldings having good impact resistance and high strength and well applicable even to lightweight, thin-walled and complicated office automation appliances, electric and electronic appliances for industrial and household use and car parts, and also to provide blow moldings of the composition.

To attain the object as above, we, the present inventors have assiduously studied various additives applicable to blow-moldable, flame-retardant polycarbonate resin compositions. As a result, we have found that, when a specific resin is selectively added to a flame-retardant polycarbonate resin composition, especially to that containing a rubber-modified styrenic resin, then it significantly improves the blow moldability of the resin composition without interfering with the flame retardancy and the thermal stability thereof, and that the resin composition-could be well stably and accurately formed into high-quality articles through blow molding. In particular, we have found that the resin composition could be molded even into large-sized, complicated and nearly tabular articles through blow molding. On the basis of these findings, we have completed the present invention.

Specifically, the invention provides the following:

(1) A flame-retardant polycarbonate resin composition comprising 100 parts by weight of a resin or resin mixture of (A) from 30 to 100% by weight of a polycarbonate resin and (B) from 0 to 70% by weight of a styrenic resin, from 1 to 50 parts by weight of (C) a flame retardant, and from 1 to 20 parts by weight of (D) a methyl methacrylate polymer having a weight-average molecular weight of at least 1,000,000.

(2) The flame-retardant polycarbonate resin composition of (1), wherein the polycarbonate resin has a branched structure.

(3) The flame-retardant polycarbonate resin composition of (1), wherein the flame retardant is a halogen-free phosphate.

(4) The flame-retardant polycarbonate resin composition of any one of (1) to (3), which further contains from 0.05 to 5 parts by weight, relative to 100 parts by weight of the resin or resin mixture of (A) and (B), of (E) a fluoro-olefinic resin.

(5) The flame-retardant polycarbonate resin composition of (4), wherein the fluoro-olefinic resin has the ability to form fibrils.

(6) The flame-retardant polycarbonate resin composition of any one of (1) to (5), wherein the resin mixture comprises (A) from 70 to 95% by weight of a polycarbonate resin and (B) from 5 to 30% by weight of a styrenic resin, and the styrenic resin is a rubber-modified styrenic resin.

(7) The flame-retardant polycarbonate resin composition of any one of (1) to (6), which further contains from 1 to 30 parts by weight, relative to 100 parts by weight of the resin or resin mixture of (A) and (B), of (F) a rubber-like elastomer.

(8) The flame-retardant polycarbonate resin composition of (7), wherein the rubber-like elastomer (F) is a core/shell type, grafted rubber-like elastomer.

(9) The flame-retardant polycarbonate resin composition of any one of (1) to (8), which further contains from 1 to 50 parts by weight, relative to 100 parts by weight of the resin or resin mixture of (A) and (B), of (G) an inorganic filler.

(10) A blow molding of the flame-retardant polycarbonate resin composition of any one of (1) to (9).

(11) The blow molding of (10), which is for housings or parts of office automation appliances, or for those of electric and electronic appliances for household use or industrial use.

DETAILED DESCRIPTION OF THE INVENTION

The invention is described in detail hereinunder. First mentioned are the components (A) to (D) constituting the flame-retardant polycarbonate resin composition of the invention.

(A) Polycarbonate Resin (PC):

The polycarbonate resin (PC) serving as the component (A) in the flame-retardant polycarbonate resin composition of the invention is not specifically defined, and may be any and every one known in the art. Generally used are aromatic polycarbonates to be produced from diphenols and carbonate precursors. For example, used are polycarbonates as produced by reacting a diphenol and a polycarbonate precursor in a solution method or in a melt method, such as those as produced through reaction of a diphenol and phosgene or through interesterification of a diphenol and a diphenyl carbonate.

Various diphenols are usable, including, for example, 2,2-bis(4-hydroxyphenyl)propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkanes, bis (4-hydroxyphenyl)oxide, bis(4-hydroxyphenyl)sulfide, bis (4-hydroxyphenyl)sulfone, bis(4-hydroxyphenyl)sulfoxide, bis(4-hydroxyphenyl)ether, bis(4-hydroxyphenyl)ketone, etc.

As the diphenols for use herein, preferred are bis (hydroxyphenyl)alkanes, especially bisphenol A. The carbonate precursors for use in the invention include, for example, carbonyl halides, carbonyl esters, haloformates, concretely, phosgene, diphenol dihaloformates, diphenyl carbonate, dimethyl carbonate, diethyl carbonate, etc. Other diphenols such as hydroquinone, resorcinol, catechol and the like are also usable in the invention. The diphenols mentioned herein may be used either singly or as combined.

The polycarbonate resin may have a branched structure, for which the branching agent includes 1,1,1-tris(4-hydroxyphenyl)ethane, α, α', α"-tris (4-hyroxyphenyl)-1,3,5-triisopropylbenzene, phloroglycine, trimellitic acid, isatin-bis(o-cresol), etc. For controlling the molecular weight of the polycarbonate resin, employable are phenol, p-t-butylphenol, p-t-octylphenol, p-cumylphenol, etc.

The polycarbonate resin for use in the invention may be a copolymer having a polycarbonate moiety and a polyorganosiloxane moiety, or it may have a moiety of the copolymer. The copolymer may be a polyester-polycarbonate resin to be produced through polymerization of a polycarbonate in the presence of an ester precursor, such as a difunctional carboxylic acid (e.g., terephthalic acid) or its ester-forming derivative. Various types of different polycarbonate resins may be mixed to give mixed polycarbonate resins for use in the invention. Preferably, the polycarbonate resin serving as the component (A) in the invention contains no halogen. In view of its mechanical strength and moldability, the polycarbonate resin preferably has a viscosity-average molecular weight of from 10,000 to 100,000, more preferably from 14,000 to 40,000.

(B) Styrenic Resin:

The styrenic resin to be the component (B) in the flame-retardant polycarbonate resin composition of the invention may be a polymer as prepared through polymerization of a monomer or monomer mixture of from 20 to 100% by weight of a monovinylic aromatic monomer such as styrene, α-methylstyrene or the like, from 0 to 60% by weight of a vinyl cyanide-type monomer such as acrylonitrile, methacrylonitrile or the like, and from 0 to 50% by weight of any other vinylic monomer copolymerizable with those monomers, such as maleimide, methyl (meth)acrylate or the like. The polymer includes, for example, polystyrenes (GPPS), acrylonitrile-styrene copolymers (AS resins), etc.

As the styrenic resin, preferred are rubber-modified styrenic resins. The modified styrenic resins are preferably impact-resistant styrenic resins as produced through grafting polymerization of rubber-like polymers with styrenic monomers. The rubber-modified styrenic resins include, for example, impact-resistant polystyrenes (HIPS) as produced through polymerization of rubber-like polymers such as polybutadiene or the like with styrene; ABS resins as produced through polymerization of polybutadiene with acrylonitrile and styrene; MBS resins as produced through polymerization of polybutadiene with methyl methacrylate and styrene, etc. These rubber-modified styrenic resins may be combined, or may be mixed with other styrenic resins not modified with rubber such as those mentioned above, and the resin mixtures may be used in the invention.

In the rubber-modified styrenic resins, the amount of the rubber-like polymer to modify them may fall, for example, between 2 and 50% by weight, but preferably between 5 and 30% by weight. If the amount of the modifying rubber-like polymer is smaller than 2% by weight, the resin composition will have poor impact resistance. If, on the other hand, it is larger than 50% by weight, the thermal stability of the resin composition will be lowered, and the melt fluidity thereof will be also lowered. If so, the resin composition will be unfavorably gelled or yellowed. Specific examples of the rubber-like polymer include polybutadiene, acrylate and/or methacrylate-having rubber-like polymers, styrene-butadiene-styrene (SBS) rubber, styrene-butadiene rubber (SBR), butadiene-acrylic rubber, isoprene rubber, isoprene-styrene rubber, isoprene-acrylic rubber, ethylene-propylene rubber, etc.

Of those, especially preferred is polybutadiene. The polybutadiene usable herein may be any of low-cis polybutadiene (for example, having from 1 to 30 mol % of 1,2-vinyl bonds and from 30 to 42 mol % of 1,4-cis bonds) or high-cis polybutadiene (for example, having at most 20 mol % of 1,2-vinyl bonds and at least 78 mol % of 1,4-cis bonds), and even their mixtures.

(C) Flame Retardant:

Where the moldings of the invention are for office automation appliances, electric and electronic appliances and the like, they shall be resistant to flames. For these, various flame retardants must be added to the moldings. Examples of flame retardants include organic phosphorus compounds, halogen-free phosphorus compounds, halogen compounds, nitrogen compounds, metal hydroxides, red phosphorus, antimony compounds, etc. The halogen compounds include, for example, tetrabromobisphenol A, halogenopolycarbonates, copolymerized oligomers of halogenopolycarbonates, decabromodiphenyl ether, halogenopolystyrenes, halogenopolyolefins, etc. The nitrogen compounds include, for example, melamine, alkyl group or aromatic group-substituted melamines, etc.; the metal hydroxides include, for example, magnesium hydroxide, aluminium hydroxide, etc.; the antimony compounds include, for example, antimony trioxide, antimony tetroxide, etc.

However, halogen-containing flame retardants are unfavorable, as often discharging harmful substances when moldings comprising them are incinerated. Therefore, preferred are halogen-free, organic phosphorus-containing flame retardants. Any organic compounds containing phosphorus but not containing halogen are employable herein with no limitation, so far as they serve as flame retardants. As the flame retardants for use herein, however, preferred are phosphate compounds having at least one esteric oxygen atom directly bonding to a phosphorus atom.

For example, preferred are phosphate compounds of the following formula (1):

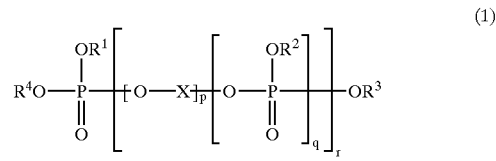

(1)

wherein $R^1$, $R^2$, $R^3$ and $R^4$ each independently represent a hydrogen atom or an organic group; X represents a divalent or higher polyvalent organic group; p is 0 or 1; q is an integer of 1 or larger; and r is an integer of 0 or larger.

In formula (1), the organic group includes, for example, substituted or unsubstituted alkyl, cycloalkyl and aryl groups, etc. The substituents for the substituted groups include, for example, alkyl groups, alkoxy groups, aryl groups, aryloxy groups, arylthio groups, etc. These substituents may be combined to give arylalkoxyalkyl groups, or may be bonded, for example, via oxygen, nitrogen or sulfur atom to give arylsulfonylaryl groups.

In formula (1), the divalent or higher polyvalent organic group X is meant to include divalent or higher polyvalent groups to be derived from the organic groups as above by removing one or more hydrogen atoms bonding to carbon atoms. For example, it includes alkylene groups, (substituted) phenylene groups, groups as derived from bisphenols of polycyclic phenols. Preferred are groups derived from bisphenol A, hydroquinone, resorcinol, diphenylmethane, dihydroxydiphenyl, dihydroxynaphthalene, etc.

The halogen-free phosphate compounds may be monomers, oligomers, polymers or their mixtures.

Concretely, they include, for example, trimethylphosphate, triethylphosphate, tributyl phosphate, trioctyl phosphate, tributoxyethyl phosphate, triphenyl phosphate, tricresyl phosphate, cresyldiphenyl phosphate, octyldiphenyl phosphate, tri(2-ethylhexyl)phosphate, diisopropylphenyl phosphate, trixylenyl phosphate, tris(isopropylphenyl) phosphate, trinaphthyl phosphate, bisphenol A bisphosphate, hydroquinone bisphosphate, resorcinol bisphosphate, resorcinol-diphenyl phosphate, trihydroxybenzene triphosphate, cresyldiphenyl phosphate, etc.

Commercially-available, halogen-free phosphates that are preferably used as the component (C) to be in the flame-retardant polycarbonate resin composition of the invention are, for example, TPP [triphenyl phosphate], TXP [trixylenyl phosphate], PFR [resorcinol(diphenyl phosphate)], PX200 [1,3-phenylene-tetrakis(2,6-dimethylphenyl)-phosphate], PX201 [1,4-phenylene-tetrakis(2,6-dimethylphenyl)) phosphate], PX202 [4,4'-biphenylene-tetrakis) (2,6-dimethylphenyl)phosphate], CR733S [phenylresorcinol polyphosphate], all from Daihachi Chemical Industry.

The amount of the flame retardant to be in the composition may fall between 1 and 50 parts by weight, but preferably between 2 and 30 parts by weight, more preferably between 3 and 15 parts by weight, relative to 100 parts by weight of the resin or resin mixture of (A) and (B). If the flame retardant content of the composition is smaller than 2 parts by weight, the composition could hardly have the intended flame retardancy. If, on the other hand, it is larger than 50 parts by weight, the heat resistance and the impact strength of the composition will be lowered. Therefore, the flame retardant content of the composition shall be comprehensively determined, depending on the necessary properties of the moldings of the composition and on the amount of the other constituent components of rubber-like elastomer, inorganic filler, etc.

(D) Methyl Methacrylate Polymer Having a Weight-average Molecular Weight of at Least 1,000,000:

The methyl methacrylate polymer having a weight-average molecular weight of at least 1,000,000, which serves as the component (D) in the polycarbonate resin composition of the invention, is preferably a copolymer of at least 30% by weight of methyl methacrylate with other copolymerizable vinylic monomers. The vinylic monomers copolymerizable with methyl methacrylate include, for example, alkyl acrylates such as ethyl acrylate, propyl acrylate, butyl acrylate, etc.; alkyl methacrylates such as ethyl methacrylate, propyl methacrylate, butyl methacrylate, etc.; aromatic vinyl compounds such as styrene, α-methylstryene, etc.; vinyl cyanides such as acrylonitrile, methacrylonitrile, etc.

Especially preferred are copolymers having a methyl methacrylate content of at least 50% by weight, as improving the outward appearance of the moldings of the composition. The methyl methacrylate copolymers may be produced in any known, single-stage or multi-stage polymerization methods of solution polymerization, suspension polymerization, emulsion polymerization of the like of methyl methacrylate with a comonomer of, for example, methyl acrylate or butyl acrylate. Above all, preferred are those as produced through emulsion polymerization of the monomers in the presence of an emulsifier that comprises, for example, a sodium or potassium dicarboxylate at least having an alkyl or alkenyl group with from 10 to 24 carbon atoms, in view of the thermal molding stability of the polycarbonate resin composition of the invention.

The methyl methacrylate polymer shall have a weight-average molecular weight of at least 1,000,000, but preferably between 1,500,000 and 5,000,000. If its molecular weight is smaller than 1,000,000, the effect of the polymer to improve the blow moldability of the composition is poor. As having such a large molecular weight, it is believed that the copolymer, when in the polycarbonate resin composition of the invention, is dispersed in the composition through kneading, thereby exhibiting its ability to improve the melt elasticity (rubber-like elasticity) of the melt of the composition. Commercial products of the methyl methacrylate polymer are available, including, for example, Metablen P series (P-550A, P-551A, P-530A, P531) from Mitsubishi Rayon.

Basically comprising the components (A), (C) and (D), the flame-retardant polycarbonate resin composition of the invention attains the object of the invention to give blow moldings of the composition with flame retardancy. Concretely, the composition comprises 100 parts by weight of a resin or resin mixture of (A) from 30 to 100% by weight, preferably from 50 to 95% by weight of a polycarbonate and (B) from 0 to 70% by weight, preferably from 5 to 50 e by weight of a styrenic resin, from 1 to 50 parts by weight, preferably from 2 to 30 parts by weight of (C) a flame retardant, and from 1 to 20 parts by weight, preferably from 1.5 to 10 parts by weight of (D) a methyl methacrylate polymer having a weight-average molecular weight of at least 1,000,000. If the proportion of the component (A), polycarbonate resin is smaller than 30% by weight in the composition, the heat resistance and the mechanical strength of the composition will be poor. The styrenic resin of the component (B) is to be in the composition so as to make the composition have the necessary melt fluidity. If its proportion is smaller than 5% by weight, the component (B) could poorly exhibit its ability to improve the moldability of the composition. If the proportion of the flame retardant of the component (C) is smaller than 1 part by weight, the flame retardancy of the composition will be poor. If, however, it is larger than 50 parts by weight, the heat resistance, the mechanical strength and the impact resistance of the composition will be poor. Therefore, the proportion of the flame retardant of the component (C) shall be suitably determined, depending on the necessary properties of the moldings of the composition, on the moldability of the composition, and even on the proportions of the other components constituting the composition.

If the proportion of the component (D), methyl methacrylate polymer having a weight-average molecular weight of at least 1,000,000 is smaller than 1 part by weight, the polymer could poorly exhibit its ability to improve the blow moldability of the composition. If, however, it is larger than 20 parts by weight, the extrusion moldability of the composition will be poor and, in addition, such a large amount of the polymer will have some negative influences on the weld strength of the composition. Therefore, it is desirable that the proportion of the component (D) is determined, comprehensively depending on the ratio of the components (A) and (B) constituting the resin mixture, on the proportion of the flame retardant of the component (C), on the proportions of the rubber-like elastomer of the component (F) and the inorganic filler of the component (G) to be mentioned in detail hereinunder, on the size, the weight and the shape of the blow moldings of the composition, and on the blow moldability, the pinch-off strength and the weld strength of the composition.

The flame-retardant polycarbonate resin composition of the invention may optionally contain (E) a fluoro-olefinic resin which exhibits a resin melt-dropping preventing effect when the composition is fired. The fluoro-olefinic resin (E)

may be a polymer or copolymer having a fluoro-ethylenic structure, for example, including difluoroethylene polymers, tetrafluoroethylene polymers, tetrafluoroethylene-hexafluoropropylene copolymers, and copolymers of tetrafluoroethylene with fluorine-free ethylenic monomers. Preferred is polytetrafluoroethylene (PTFE) desirably having a mean molecular weight of at least 500,000, more desirably from 500,000 to 10,000,000. All types of polytetrafluoroethylene known in the art are usable herein.

More preferred is polytetrafluoroethylene having the ability to form fibrils, as its property of preventing resin melts from dropping is better. The fibril-forming polytetrafluoroethylene (PTFE) is not specifically defined, but preferred is PTFE of Type 3 stipulated in the ASTM Standard. Specific examples of PTFE of Type 3 include Teflon 6-J (from Mitsui-DuPont Fluorochemical), Polyflon D-1, Polyflon F-103, Polyflon F201L (all from Daikin Industry), CD-076 (from Asahi ICI Fluoropolymers), etc.

Others except PTFE of Type 3 are also employable herein, including, for example, Argoflon F5 (from Montefluos), Polyflon MPA, FA-100 (both from Daikin Industry), etc. These polytetrafluoroethylenes (PTFEs) may be used either singly or as combined. The fibril-forming polytetrafluoroethylenes (PTFEs) as above may be obtained, for example, by polymerizing tetrafluoroethylene in an aqueous solvent in the presence of sodium, potassium or ammonium peroxydisulfide, under a pressure of from 1 to 100 psi, at a temperature falling between 0 and 200° C., preferably between 20 and 100° C.

The fluoro-olefinic resin content of the composition may fall between 0.05 and 5 parts by weight, but preferably between 0.1 and 2 parts by weight relative to 100 parts by weight of the resin or resin mixture of (A) and (B). If the fluoro-olefinic resin content is smaller than 0.05 parts by weight, the resin melt-dropping preventing ability of the composition will be not enough for the intended flame retardancy of the composition. However, even if the content is larger than 5 parts by weight, the effect of the fluoro-olefinic resin added could not be augmented any more, and such a large amount of the fluoro-olefinic resin, if added to the composition, will have some negative influences on the impact resistance and the outward appearance of the moldings of the composition. Therefore, the amount of the fluoro-olefinic resin to be added to the composition may be suitably determined, depending on the necessary flame retardancy of the moldings of the composition, for example, based on V-0, V-1 or V-2 in UL-94, and depending on the amount of the other constituent components.

The flame-retardant polycarbonate resin composition of the invention may further contain (F) a rubber-like elastomer to further improve the impact resistance of the moldings of the composition. The amount of the component (F) may fall between 1 and 30 parts by weight, but preferably between 2 and 15 parts by weight, relative to 100 parts by weight of the resin or resin mixture of the components (A) and (B). The amount of the rubber-like elastomer to be in the composition shall be determined, depending on the total properties (e.g., impact resistance, heat resistance, rigidity) of the intended moldings. The rubber-like elastomer includes, for example, polybutadiene, polyisoprene, styrene-butadiene-styrene (SBS) rubber, styrene-butadiene rubber (SBR), butadiene-acrylic rubber, isoprene-styrene rubber, isoprene-acrylic rubber, ethylene-propylene rubber, ethylene-propylene-diene rubber, siloxane rubber, etc.

Of those, preferred are powdery or granular rubber-like elastomers having a two-layered core/shell structure in which the core is of a flexible rubber material and the shell that covers the core is of a rigid resin material. After blended with a polycarbonate resin melt, the rubber-like elastomers of that type mostly keep their original granular condition. Since the rubber-like elastomer keeps its original granular condition after having been blended with a polycarbonate resin melt, it is effective for preventing the moldings of the resin composition from being troubled by surface layer peeling.

Known are various core/shell-type, grafted rubber-like elastomers that are usable herein. Commercially-available products of such elastomers include, for example, Hiblen B621 (from Nippon Zeon), KM-330 (form Rohm & Haas), Metablen W529, Metablen S2001, Metablen C223, Metablen B621 (all from Mitsubishi Rayon), etc.

Above all, preferred are those to be produced through polymerization of one or more vinylic monomers in the presence of a rubber-like polymer as obtained from monomers of essentially alkyl acrylates or alkyl methacrylates and dimethylsiloxane. In the alkyl acrylates and methacrylates, the alkyl group preferably has from 2 to 10 carbon atoms. Concretely, the alkyl acrylates and methacrylates include, for example, ethyl acrylate, butyl acrylate, 2-ethylhexyl acrylate, n-octyl methacrylate, etc. One example of the rubber-like elastomers as obtained from monomers of essentially those alkyl acrylates is a polymer to be prepared through reaction of at least 70% by weight of the alkyl acrylates with at most 30% by weight of other copolymerizable vinylic monomers such as methyl methacrylate, acrylonitrile, vinyl acetate, styrene and the like. To prepare the polymer, a polyfunctional monomer serving as a crosslinking agent, such as divinylbenzene, ethylene dimethacrylate, triallyl cyanurate, triallyl isocyanurate or the like, may be added to the polymerization system.

The vinylic monomers to be polymerized in the presence of a rubber-like polymer include, for example, aromatic vinyl compounds such as styrene, α-methylstyrene, etc.; acrylates such as methyl acrylate, ethyl acrylate, etc.; methacrylates such as methyl methacrylate, ethyl methacrylate, etc. One or more these monomers may be (co)polymerized, as combined, or may be copolymerized with any other vinylic monomers such as vinyl cyanide compounds (e.g., acrylonitrile, methacrylonitrile), vinyl esters (e.g., vinyl acetate, vinyl propionate), etc. The (co)polymerization may be effected in any known method of, for example, bulk polymerization, suspension polymerization, emulsion polymerization or the like. Preferred is emulsion polymerization.

It is desirable that the core/shell-type, grafted rubber-like elastomers thus produced in the manner mentioned above contain at least 20% by weight of the rubber-like polymer moiety. Typical examples of the core/shell-type, grafted rubber-like elastomers are MAS resin elastomers such as graft copolymers of styrene and methyl methacrylate with from 60 to 80% by weight of n-butyl acrylate. Other examples are composite rubber grafted copolymers to be prepared through graft copolymerization of a composite rubber with at least one vinylic monomer, in which the composite rubber comprises from 5 to 95% by weight of a polysiloxane component and from 5 to 95% by weight of a polyacryl (meth) acrylate rubber component as so entangled that they are not separated from each other, and has a mean grain size of from 0.01 to 1 μm or so. The composite rubber grafted copolymers are better than single rubber grafted copolymers, as their effect of improving the impact resistance of resin moldings is higher than that of the latter, single rubber grafted copolymers. Commercial products of such composite rubber grafted copolymers are available, for example, Metablen S-2001 from Mitsubishi Rayon.

The flame-retardant polycarbonate resin composition of the invention may further contain (G) an inorganic filler which is to further increase the rigidity and the flame retardancy of the moldings of the composition and to further improve the blow moldability of the composition. The inorganic filler includes, for example, talc, mica, kaolin, diatomaceous earth, calcium carbonate, calcium sulfate, barium sulfate, glass fibers, carbon fibers, potassium titanate fibers, etc. Of those, preferred are tabular fillers of talc, mica, etc., and fibrous fillers. Talc is a hydrous silicate of magnesium, and any commercially-available products of it are employable herein. Talc may contain a minor amount of aluminium oxide, calcium oxide and iron oxide, in addition to the essential components of silica acid and magnesium oxide. In producing the resin composition of the invention, any talc even containing such minor components is employable. The inorganic filler such as talc for use in the invention generally has a mean grain size of from 0.1 to 50 $\mu$m, but preferably from 0.2 to 20 $\mu$m. Containing the inorganic filler as above, especially talc, the rigidity of the moldings of the invention is further increased and, in addition, the amount of the flame retardant, halogen-free phosphate to be in the composition could be reduced.

The amount of the component (G), inorganic filler may fall between 1 to 50 parts by weight, but preferably between 2 and 30 parts by weight, relative to 100 parts by weight of the resin or resin mixture of (A) and (B). If its amount is smaller than 1 part by weight, the inorganic filler added could not satisfactorily exhibit its effect of improving the rigidity and the flame retardancy of the moldings of the composition and of improving the blow moldability of the composition. However, if the amount is larger than 50 parts by weight, the impact resistance of the moldings will lower and the melt fluidity of the composition will lower. The amount of the inorganic filler to be in the composition shall be suitably determined, depending on the size, the weight and the necessary properties of the moldings and on the blow moldability of the composition.

Apart from the essential components (A), (C) and (D) and one or more optional components selected from (B) and (E) to (G), the flame-retardant polycarbonate resin composition of the invention may further contain any other additives which are generally added to ordinary thermoplastic resins, if desired. The additives are for further improving the blow moldability and the flame retardancy and for improving the outward appearance, the weather resistance and the rigidity of the moldings of the composition. For example, the additives include phenolic or phosphorus- or sulfur-containing antioxidants, antistatic agents, polyamide-polyether block copolymers (for permanent static electrification resistance), benzotriazole-type or benzophenone-type UV absorbents, hindered amine-type light stabilizers (weather-proofing agents), microbicides, compatibilizers, colorants (dyes, pigments), etc. The amount of the optional additive is not specifically defined, provided that it does not interfere with the properties, especially the blow moldability of the flame-retardant polycarbonate resin composition of the invention.

The method for producing the flame-retardant polycarbonate resin composition of the invention is described. The composition may be produced by mixing and kneading the components (A), (C) and (D) in a predetermined ratio as above, optionally along with the optional components (B) and (E) to (G) and with additives as above in any desired ratio. Formulating and mixing them may be effected in any known manner, for example, by pre-mixing them in an ordinary device, such as a ribbon blender, a drum tumbler or the like, followed by further kneading the resulting pre-mix in a Henschel mixer, a Banbury mixer, a single-screw extruder, a double-screw extruder, a multi-screw extruder, a cokneader or the like. The temperature at which the components are mixed and kneaded generally falls between 240 and 300° C. Other components than the polycarbonate resin and the styrenic resin may be previously mixed with the polycarbonate or styrenic resin or with any other thermoplastic resin to prepare a master batch, and it may be added to the other constituent components.

Having been prepared in the manner noted above, the flame-retardant polycarbonate resin composition of the invention may be molded into various moldings in the melt-molding devices as above, or, after it is pelletized, the resulting pellets may be molded into various moldings through injection molding, injection compression molding, extrusion molding, blowmolding, press molding, vacuum molding or foaming. Preferably, the composition is pelletized in the melt-kneading manner as above, and the resulting pellets are molded into sheet moldings through extrusion blow molding or extrusion sheet molding. Then, the resulting sheets are further worked for vacuum molding or the like that specifically requires the draw-down resistance of resin melts, more favorably for blow molding.

The blow moldings of the flame-retardant polycarbonate resin composition of the invention have many applications with no specific limitation. For example, they are usable as covers or housings of various office automation appliances requiring flame retardancy, such as duplicators, etc.; as housings and parts of various electric and electronic appliances for household use such as refrigerators, microwave ovens, etc.; and as car parts, etc.

The invention is described in more detail with reference to the following Examples and Comparative Examples, which, however, are not intended to restrict the scope of the invention.

EXAMPLES 1 to 4, AND COMPARITIVE EXAMPLES 1 AND 2

The components shown in Table 1 below were blended in the ratio indicated therein (the components (A) and (B) are in terms of % by weight, and the other components are in terms of parts by weight relative to 100 parts by weight of the total of (A) and (B)), fed into an extruder (VS40 from Tanabe Plastic Machinery), melted and kneaded therein at 260° C., and then pelletized. To all compositions of Examples and Comparative Examples, added were 0.2 parts by weight of Irganox 1076 (from Ciba-Geigy) and 0.1 parts by weight of Adekastab C (from Asahi Denka Industry) both serving as an antioxidant. The melt index and the melt tension of the pellets were measured. In addition, the pellets were dried at 80° C. for 12 hours, and then molded into test pieces through injection molding at 260° C. These test pieces were tested for their flame retardancy. The data obtained are all in Table 1.

The materials used for producing the test samples, and the methods for testing the samples are mentioned below.

(A) Polycarbonate Resins (bisphenol A polycarbonate resins)

PC-1:
    Toughlon A2700 (from Idemitsu Petrochemical), having a viscosity-average molecular weight of 27000.

PC-2:
    Toughlon A2500 (from Idemitsu Petrochemical), having a viscosity-average molecular weight of 25000.

PC-3:

Toughlon IB2500 (branched polycarbonate from Idemitsu Petrochemical), having a viscosity-average molecular weight of 25000.

(B) Styrenic Resin (impact-resistant polystyrene resin, HIPS): Idemitsu PS HT52 (from Idemitsu Petrochemical).

This is a polystyrene-grafted polybutadiene having MI of 2 g/10 min (at 200° C., under a load of 5 kg)

(C) Flame Retardant (phosphate): PFR (from Asahi Denka Industry).

This is resorcinol-bis(diphenol phosphate).

(D) Methyl Methacrylate Polymer (MMA):

Metablen P-530A (from Mitsubishi Rayon), having a weight-average molecular weight of 3,000,000.

(E) Polytetrafluoroethylene (PTFE):

F201L (from Daikin Chemical Industry), having a molecular weight of from 4,000,000 to 5,000,000.

(F) Rubber-like Elastomer (core/shell-type, grafted rubber-like elastomer): Metablen S2001 (from Mitsubishi Rayon).

This is a composite rubber-grafted copolymer having a polydimethylsiloxane content of at least 50% by weight.

(G) Talc: FFR (from Asada Flour Milling), Having a Mean Grain Size of 0.7 $\mu$m.

Testing Methods (1) Melt index (MI):

Measured at 280° C. under a load of 2.16 kg.

(2) Flame retardancy:

Tested according to the UL94 combustion test. Samples tested had a thickness of 1.5 mm.

(3) Melt tension (g):

A sample was extruded through a capillary having a diameter of 2 mm, at a shear rate of 1 sec$^{-1}$, at a temperature of 250° C. and at a taking away speed of 3.1 m/min, whereupon the load for taking the sample away through the capillary was measured.

(4) Blow Moldability:

Using a molding machine (Placo's DAC-50), a sample was molded into blow moldings (blow panels to be tested, for which the parison weighed 2 kg). The molding resin temperature was 240° C., and the mold temperature was 40° C. The parison and the blow panel were tested for the following:

Draw-down time (sec): After the parison was extruded out, the time taken by it for 20% elongation was measured. The longer time indicates better draw-down resistance and better moldability of the sample.

Pinch-off strength: A test piece of 25 mm×40 mm in size was cut out of the pinch-off part of a blow panel sample, and subjected to a tear test to measure its pinch-off strength (MPa)

Total Evaluation:

○: Good parisons were formed, and good moldings were obtained.

X: Good parisons were not formed.

TABLE 1

|  |  |  | Ex. 1 | Comp. Ex. 1 | Ex. 2 | Ex. 3 | Comp. Ex. 2 | Ex. 4 |
|---|---|---|---|---|---|---|---|---|
| Composition | (A) | PC-1 | 80 | 80 | — | — | — | — |
|  |  | PC-2 | — | — | 80 | 80 | 80 | — |
|  |  | PC-3 | — | — | — | — | — | 80 |
|  | (B) | HIPS | 20 | 20 | 20 | 20 | 20 | 20 |
|  | (C) | Flame retardant, PFR | 11 | 11 | 10 | 10 | 10 | 8 |
|  | (D) | MMAP-530A | 3 | — | 6 | 6 | — | 3 |
|  | (E) | PTFE | 0.2 | 0.2 | 0.2 | 0.2 | 0.2 | 0.2 |
|  | (F) | Rubber-like elastomer | 4 | 4 | 4 | 4 | 4 | 4 |
|  | (G) | Talc | — | — | — | 5 | 5 | 5 |
| Test Results | (1) | MI | 19 | 22 | 20 | 18 | 24 | 17 |
|  | (2) | Flame retardancy, UL-94 | V-0 | V-0 | V-0 | V-0 | V-0 | V-0 |
|  | (3) | Melt tension (g), 250° C. | 2.8 | 2.0 | 2.9 | 2.8 | 2.3 | 4.0 |
|  | (4) | Blow moldability |  |  |  |  |  |  |
|  |  | Draw-down time (sec) | 4.0 | 2.0 | 4.0 | 4.0 | 2.0 | 6.0 |
|  |  | Pinch-off strength (MPa) | 150 | 80 | 135 | 130 | 70 | 125 |
|  |  | Total evaluation | ○ | X | ○ | ○ | X | ○ |

As described in detail hereinabove, the flame-retardant polycarbonate resin composition of the invention comprises a resin component of a polycarbonate resin (PC) and optionally a styrenic resin (PS), and contains a flame retardant and a methyl methacrylate polymer having an ultra-high molecular weight. The composition has good flame retardancy and good blow moldability. Preferably, the composition contains a halogen-free phosphate as the retardant and further contains a fluoro-olefinic resin, and its blow moldability is much improved to give blow moldings having better flame retardancy with no problem of environmental pollution. Also preferably, the composition further contains a rubber-like elastomer and an inorganic filler, which further improve the impact resistance, the rigidity, the heat resistance and the flame retardancy of the moldings of the composition. The moldings of the composition have many applications, for example, for lightweight and resources-saving office automation appliances, etc.

While the invention has been described in detail and with reference to specific embodiments thereof, it will be apparent to one skilled in the art that various changes and modifications can be made therein without departing from the spirit and scope thereof.

What is claimed is:

1. A flame-retardant polycarbonate resin composition comprising 100 parts by weight of a resin or resin mixture of (A), from 30 to 95% by weight of a polycarbonate resin and (B) from 5 to 70% by weight of a rubber-modified styrenic resin, from 1 to 50 parts by weight of (C) a flame retardant, from 1 to 20 parts by weight of (D) a methyl methacrylate polymer having a weight-average molecular weight of at least 1,000,000, from 0.05 to 5 parts by weight, relative to 100 parts by weight of the resin or resin mixture of (A) and (B), of (E) a fluoro-olefinic resin and from 1 to 50 parts by weight, relative to 100 parts by weight of the resin or resin mixture of (A) and (B), of (G) talc.

2. The flame-retardant polycarbonate resin composition as claimed in claim 1, wherein the polycarbonate resin has a branched structure.

3. The flame-retardant polycarbonate resin composition as claimed in claim 1, wherein the flame retardant is a halogen-free phosphate.

4. The flame-retardant polycarbonate resin composition as claimed in claim 1, wherein the fluoro-olefinic resin has the ability to form fibrils.

5. A flame-retardant polycarbonate resin composition as claimed in claim 1, wherein the resin mixture comprises from 5 to 30% by weight of the styrenic resin.

6. The flame-retardant polycarbonate resin composition as claimed in claim 1, which further contains from 1 to 30 parts by weight, relative to 100 parts by weight of the resin or resin mixture of (A) and (B), of (F) a rubber-like elastomer.

7. The flame-retardant polycarbonate resin composition as claimed in claim 6, wherein the rubber-like elastomer (F) is a core/shell type, grafted rubber-like elastomer. by weight of a polycarbonate resin and (B) from 5 to 30% by weight of a styrenic resin, and the styrenic resin is a rubber-modified styrenic resin.

8. A blow molded article of the flame-retardant polycarbonate resin composition of claim 1.

9. The blow molded article as claimed in claim 8, which is a component part of an office automation appliance, or a household or industrial electronic appliance.

10. A flame-retardant polycarbonate resin composition as claimed in claim 1, wherein said talc (G) is present in an amount between 2 and 30 parts by weight, relative to 100 parts by weight of the resin or resin mixture of (A) and (B).

\* \* \* \* \*